(12) United States Patent
Poudyal

(10) Patent No.: US 9,070,378 B2
(45) Date of Patent: Jun. 30, 2015

(54) PARTIAL WRITE SYSTEM

(71) Applicant: Seagate Technology LLC, Cupertino, CA (US)

(72) Inventor: Sundar Poudyal, Boulder, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 13/799,827

(22) Filed: Mar. 13, 2013

(65) Prior Publication Data

US 2014/0098438 A1 Apr. 10, 2014

Related U.S. Application Data

(60) Provisional application No. 61/712,091, filed on Oct. 10, 2012.

(51) Int. Cl.
| | | |
|---|---|---|
| G11B 5/02 | (2006.01) | |
| G11B 5/09 | (2006.01) | |
| G11B 5/012 | (2006.01) | |
| G11B 20/10 | (2006.01) | |
| G11B 20/12 | (2006.01) | |

(52) U.S. Cl.
CPC .... *G11B 5/09* (2013.01); *G11B 5/012* (2013.01); *G11B 20/10527* (2013.01); *G11B 20/1217* (2013.01); *G11B 2020/1242* (2013.01)

(58) Field of Classification Search
None
See application file for complete search history.

(56) References Cited

U.S. PATENT DOCUMENTS

| | | | |
|---|---|---|---|
| 3,930,234 A * | 12/1975 | Queisser et al. ............... | 711/111 |
| 7,490,212 B2 | 2/2009 | Kasiraj et al. | |
| 8,055,858 B2 | 11/2011 | Venturi | |
| 8,259,544 B2 | 9/2012 | Nakamura | |
| 8,537,481 B1 * | 9/2013 | Bandic et al. .................... | 360/31 |
| 8,743,492 B2 * | 6/2014 | Bui et al. ......................... | 360/31 |
| 2008/0304172 A1 * | 12/2008 | Bi et al. .......................... | 360/48 |
| 2010/0232049 A1 * | 9/2010 | Kompella et al. ............... | 360/55 |
| 2011/0242695 A1 * | 10/2011 | Lee ................................. | 360/55 |

* cited by examiner

*Primary Examiner* — Andrew L Sniezek
(74) *Attorney, Agent, or Firm* — HolzerIPLaw, PC

(57) ABSTRACT

A method and system can be implemented to perform a read-modify-write operation on data recorded in a shingled media format. In one embodiment, a write operation on a band of data stored on a magnetic recording medium is initiated at an intermediate position within the band of data. This is particularly well-suited for data written by a shingled media write operation.

19 Claims, 6 Drawing Sheets

PARTIAL WRITE SYSTEM

CROSS REFERENCES TO RELATED APPLICATIONS

This application claims the benefit under 35 U.S.C. section 119 of U.S. provisional patent application No. 61/712,091 filed on Oct. 10, 2012 and entitled "Partial Write System" which is hereby incorporated by reference in its entirety and for all purposes.

BACKGROUND

Memory devices, such as disc drives, are used to store data. Computer systems intermittently update the data stored on memory devices so as to replace the old data with new data. When a data storage operation does not affect the integrity of the data stored in a neighboring data storage location(s), the information stored in a particular storage location can be updated by simply replacing the old data in that storage location with new data. However, when a data storage operation does affect the integrity of data stored in a neighboring location(s), an update operation for a particular storage location can be more challenging.

SUMMARY

This Summary is provided to introduce a selection of concepts in simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations and implementations as further illustrated in the accompanying drawings and defined in the appended claims.

In accordance with one embodiment, a system and method can be implemented for initiating a write operation on a band of data stored on a magnetic recording medium at an intermediate position within the band of data.

These and various other features and advantages will be apparent from the following detailed description.

BRIEF DESCRIPTION OF THE DRAWINGS

A further understanding of the nature and advantages of the present technology may be realized by reference to the figures, which are described in the remaining portion of the specification.

DETAILED DESCRIPTION

Figure 1:
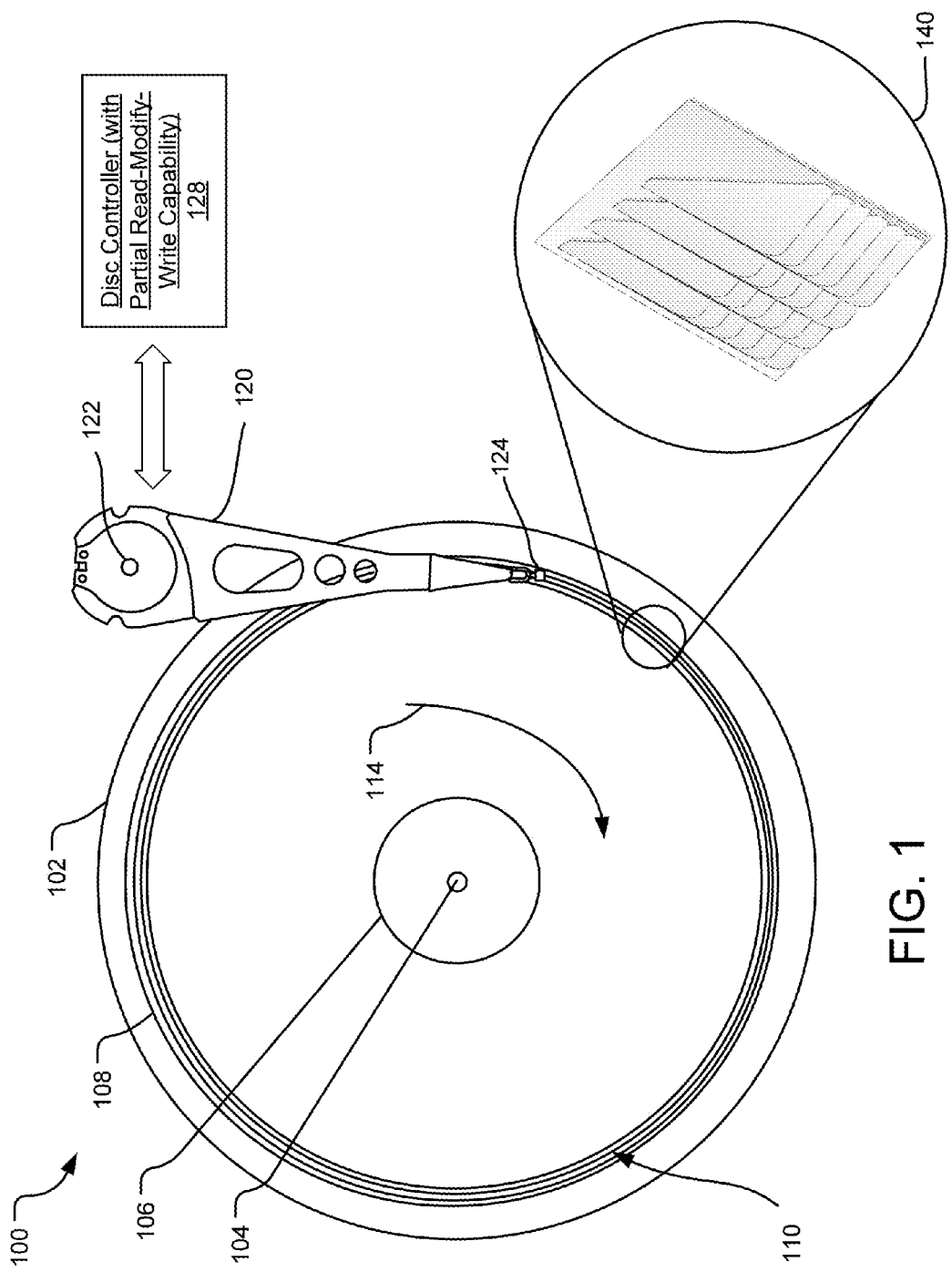
FIG. 1 illustrates an example of a memory disc and armature for performing a memory read/write operation using shingled media recording, in accordance with one embodiment.

Magnetic media storage drives store data in polarized cells on one or more magnetized media within each storage drive. One example of a magnetic media storage drive is a magnetic disc drive, which includes a disc (e.g., disc 102 of FIG. 1) that has polarized cells arranged in concentric, generally circular data tracks. In operation, one or more of the discs rotate at a constant high speed within the storage drive while information is written to and read from the tracks on the disc(s) using an actuator assembly. The actuator assembly rotates during a seek operation about a bearing shaft assembly positioned adjacent the discs.

The actuator assembly includes one or more actuator arms that extend toward the discs. A head with a read pole and a write pole is mounted at the distal end of each of the actuator arms. The write pole generates a magnetic field that writes data to a disc by changing the magnetic polarization of the cells on the disc that rotates beneath the head. The read pole reads data from the disc by detecting the magnetic polarization of the cells on the disc.

In non-shingled magnetic media, each of the cells on a magnetized medium are of a sufficiently large size relative to the size of the write pole to allow the write pole to write data to the cells without overwriting data in any surrounding cells. As a result, data may be randomly written to available cells anywhere on the magnetic medium. However, as requirements for data storage density increase for magnetic media, cell size decreases. A commensurate decrease in the size of the write pole is difficult because a strong write field gradient provided by a larger write pole is often required to shift the polarity of the cells on the magnetized medium. As a result, writing data to smaller cells on the magnetized medium using the relatively larger write pole may affect the polarization of adjacent cells (i.e., overwriting the adjacent cells). One technique for adapting the magnetic medium to utilize smaller cells while preventing adjacent data being overwritten during a write operation is shingled magnetic recording (SMR).

SMR utilizes a large strong write field generated by the write pole. One constraint of shingled magnetic recording is that when data is written to the magnetic media, it is written in sequentially increasing or decreasing radius tracks. The strong write field affects two or more adjacent tracks including the track being written to and one or more previously-written tracks. As a result, in order to change any data cell within the shingled data, all of the shingled data is re-written in the selected sequential write order.

In order to achieve the increased cell density made possible by SMR while compensating for a lack of random write functionality in such a system, one or more isolation regions may be created within with shingled data. The isolation regions, also referred to as guard tracks, are groupings of one or more adjacent data tracks within the shingled data that are unavailable for recording. In operation, the isolation regions define separate data bands (i.e., groups of logical sectors bounded by guard tracks) of shingled data. Typically, each guard track is wide enough to prevent any overwriting across the guard track. As a result, the guard tracks create bands of shingled data, including one or more adjacent tracks that are isolated from other bands. Consequently, a single band of shingled data is rewritten (rather than all of the shingled data on the disk) when one or more cells within the band are changed.

However, re-writing one or more cells of data in a data band still typically entails multiple steps, including: reading the entire data band, writing data of the data band into a media scratch pad (e.g., a temporary cache) on a memory storage device, reading the data from the media scratch pad, and re-writing the data to the original data band with the one or more changed cells. This series of operations to write data to one or more cells in a data band is herein referred to as a "read-modify-write" operation. Such reading and re-writing data of the entire band in a conventional read-modify-write operation is time consuming and an inefficient use of power.

To address the needs for both increased cell density and storage and also for time and power efficiency, some SMR write operations can be performed by reading data from selected (i.e., less than all) data tracks of a data band, writing data of the selected data tracks into a media scratch pad, reading such data from the media scratch pad, and subsequently writing data to the selected data tracks with one or more changed cells. This series of operations is referred to herein as a "partial read-modify-write" operation. In one embodiment, a partial read-write-modify operation reads and writes data to a single data track.

Embodiments of the present technology are disclosed herein in the context of a disc drive system. However, it should be understood that the technology is not limited to a disc drive system and could readily be applied to other technology systems as well.

With reference now to FIG. 1, an example of a disc drive system is shown. FIG. 1 illustrates a perspective view 100 of a disc drive system that utilizes shingled media recording. A disc 102 rotates about a spindle center or a disc axis of rotation 104 during operation in the direction shown by arrow 114. The disc 102 includes an inner diameter 106 and an outer diameter 108 between which are a number of concentric data tracks 110, illustrated by circular lines. Information may be written to and read from the disc 102 along different data tracks 110.

A transducer head 124 is mounted on an actuator assembly 120 at an end distal to an actuator axis of rotation 122. The transducer head 124 flies in close proximity above the surface of the disc 102 during disc operation. The actuator assembly 120 rotates during a seek operation about the actuator axis of rotation 122 positioned adjacent to the disc 102. The seek operation positions the transducer head 124 over a target data track of the data tracks 110.

The exploded view 140 illustrates a closer view of shingled media tracks 110 with the storage areas shown as shingled media bit locations. As described above, a grouping of two or more consecutive shingled media tracks may be referred to as a band. Bands may be isolated from one another by guard tracks. The write process does not overlap any data tracks in a different band. Thus, the shingled media tracks 110 may all belong to a single data band. Alternatively, one or more of the shingled media tracks 110 may be a guard track that divides two different bands of data on the disc 102.

In one implementation, a media controller 128 performs a partial read-modify-write operation. FIG. 1 shows a media controller 128 interfacing with the actuator assembly 120 to control partial read-modify-write operations in a shingled media format. In one implementation, a partial read-modify-write operation causes the transducer head 124 to write data to an intermediate location within a band of SMR tracks by reading data of selected tracks within the band, writing data of the selected tracks to a media scratch pad, reading data of the selected tracks out of the media scratch pad, and writing data to the selected tracks with one or more changed cells. This partial read-modify-write operation is more efficient than a conventional SMR read-modify-write operation because only a sub-portion of the band is read and re-written—the entire band need not be read and re-written.

Figure 2:
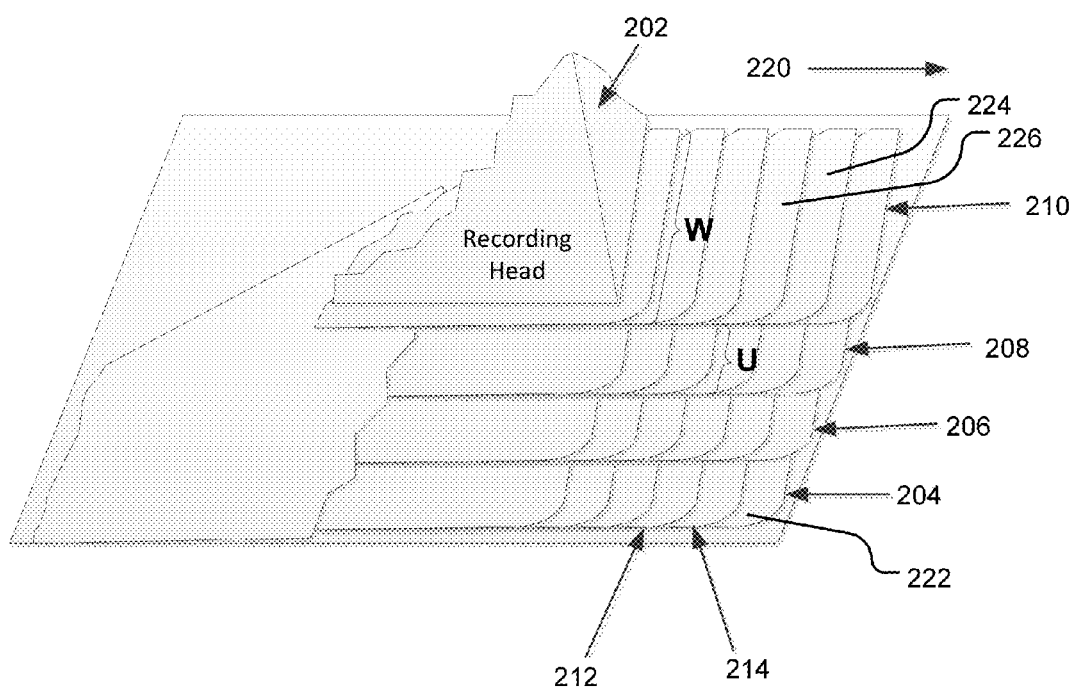
FIG. 2 illustrates an example of how data can be recorded in a shingled media recording system at an intermediate position within a band of data, in accordance with one embodiment.

FIG. 2 illustrates a more detailed example of shingled media. FIG. 2 shows tracks 204, 206, 208, and 210, which form a band. In track 204, memory locations are shown as shingled bit locations (e.g., data cells). For example, shingled bit locations 212 and 214 each store individual bit values. The recording head 202 performs successive write operations in successive bit locations as the disc moves beneath the write head in direction 220. Each successive write operation overlaps a portion of the preceding bit location. The recording head 202 generates a write field that affects shingled bit locations spanning a width "W" on the track 210. Due to the span of the write field W, two tracks of width "U" (e.g., the tracks 208 and 206) may be affected by a single pass of a writer on the recording head 202. For example, the recording head 202 may affect data bits in both of the tracks 208 and 206 while writing to the track 208.

In accordance with certain embodiments, the process of updating SMR data can be accomplished by performing a partial read-modify-write operation. For example, FIG. 2 shows a band of data beginning at bit location 222 and including tracks 204, 206, 208, and 210. During a partial write operation, data of the track 208 is updated by accessing consecutive data tracks in the band following 208 (e.g., 206, 204, etc.) without accessing data tracks preceding the track 208 (e.g., the data track 210).

In addition, a partial read-modify-write operation can be performed by beginning a read operation from an intermediate position within a track of the data band. For example, a partial read-modify-write operation can begin at bit location 224 in track 210. As data is written over the track 210, the disc spins beneath the recording head 202 in the direction of arrow 220. Thus, the next bit written to the disc is bit location 226.

Figure 3:
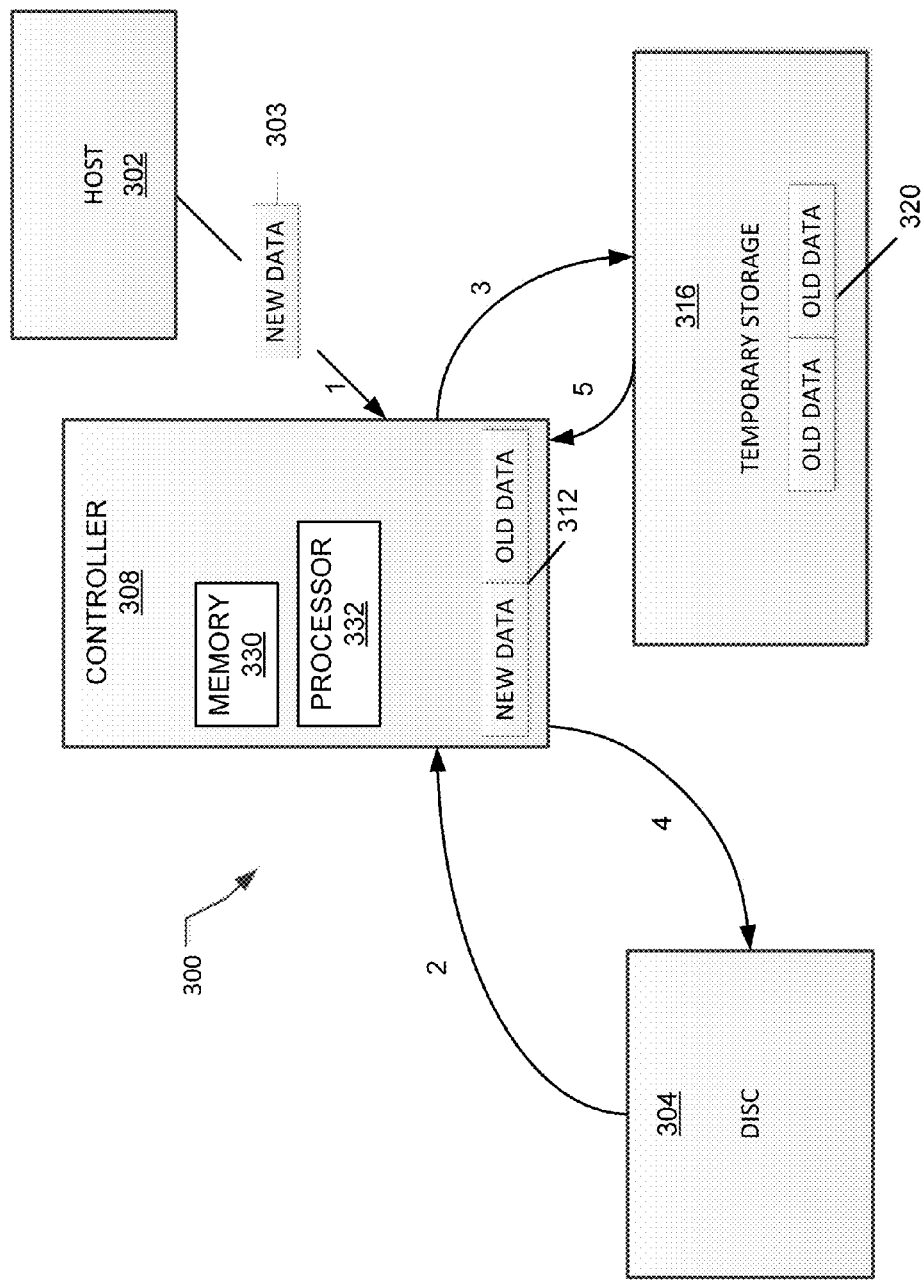
FIG. 3 illustrates a system for performing a memory update operation, in accordance with one embodiment.

FIG. 3 illustrates an example system 300 for performing a memory update in a disc 304 using a partial band writing operation. A host 302 provides new data 303 that is to be stored on the disc 304 in place of existing data as well as an address that indicates where the new data is to be stored on the disc. In the illustrated embodiment, the address for the new data is not located at the beginning of the band, but is located at an intermediate location between the beginning and end of the band. This operation is indicated by the arrow designated as 1 in FIG. 3.

The host 302 communicates with the media controller 308 to notify the controller that the disc is to be updated. The controller 308 can take a variety of configurations. In accordance with certain embodiments, the controller 308 includes firmware configured as part of the disc drive system. A memory 330 can be utilized to store the firmware as well as other data. Processor 332 can be utilized to perform the functions dictated by the firmware as well as any other programs. The controller receives the new data 303 and stores the new data locally at the controller in this example. The controller 308 also receives the target address where the new data is to be stored, wherein the target address is at an intermediate location between the beginning and end of the band.

To perform a partial update operation, the controller backs up any data that will be written over by the memory update operation. Thus, arrow 2 indicates that the controller retrieves the data beginning at least from the target address in the band where the new data is to be stored and through the end of the band. For example, this old data can be conveyed to the controller and then stored in temporary storage area 316. The temporary storage area 316 may be a static region of the media 204 (e.g., a static region of a disc), or a region of other memory (e.g., volatile memory, SSD memory, etc.). Such a storage area is also referred to herein as a "media scratch pad." The arrow 3 is used to show the conveyance of the old data to temporary storage area 316.

FIG. 3 further illustrates that a modified set of data can be prepared for storage on the disc 304. In this example, the controller prepares the modified set of data by creating a string of data shown as string of data 312. The string of data 312 represents the new data 303 appended with the existing old data stored on the disc that runs from the end of the new data to the end of the band. Thus, if the band includes three tracks of data and the insertion of new data is intended to be made at the beginning of the third track, the string of data shown as 312 would include the new data 303 followed by the remaining old data in track 3 that has not been replaced. Track 3 would be written over with this data string 312 in a shingled media format. Arrow 4 represents the operation of writing the data string 312 to the disc.

If the update operation should fail, the temporary storage area 316 holds a copy of the old data for recovery purposes. For example, if the storage operation represented by arrow 4 fails in mid-stream such that only a portion of the new data 303 is written to the disc, the old data 320 stored in temporary storage may be retrieved and written back to its original position. Arrow 5 represents such a recovery operation. The temporary storage provides a reliable backup capability in case an error should occur in the modification process.

The process described above is referred to as a partial read-modify-write operation. During a partial read-modify-write operation, one does not need to access (e.g., read and write) data in all of the data tracks of a data band. For example, where a band includes three tracks, one does not need to read all three tracks if the new data is to be used to update a location in the third track. Rather, one simply reads data beginning proximate to where the new data is to be stored in the third track through the end of the third track. In this example, one saves the time of having to read data from and write data to the first and second tracks in the band that are not changed by the write operation. Reducing the quantity of data read and written from an SMR media in this way improves storage device efficiency and reduces power consumption.

If a track is divided into segments and the new data is to be written to a location that begins in the middle of a segment, one might choose to perform a partial read-modify-write operation by retrieving data from the beginning of the segment where the new data is to be written.

While FIG. 3 shows an example in which the controller 308 creates the data string 312, the system could be implemented differently. For example, the host might direct the controller to store the old data 320 in temporary storage. Then, the host might form the new data string 312 and communicate the new data string 312 to the controller 308.

Moreover, while the temporary storage 316 is shown separate from the controller 308, the temporary storage 316 could be part of the controller 308, as well.

In another embodiment, the host might perform the operations of the controller rather than utilizing the controller to perform those operations.

Figure 4:
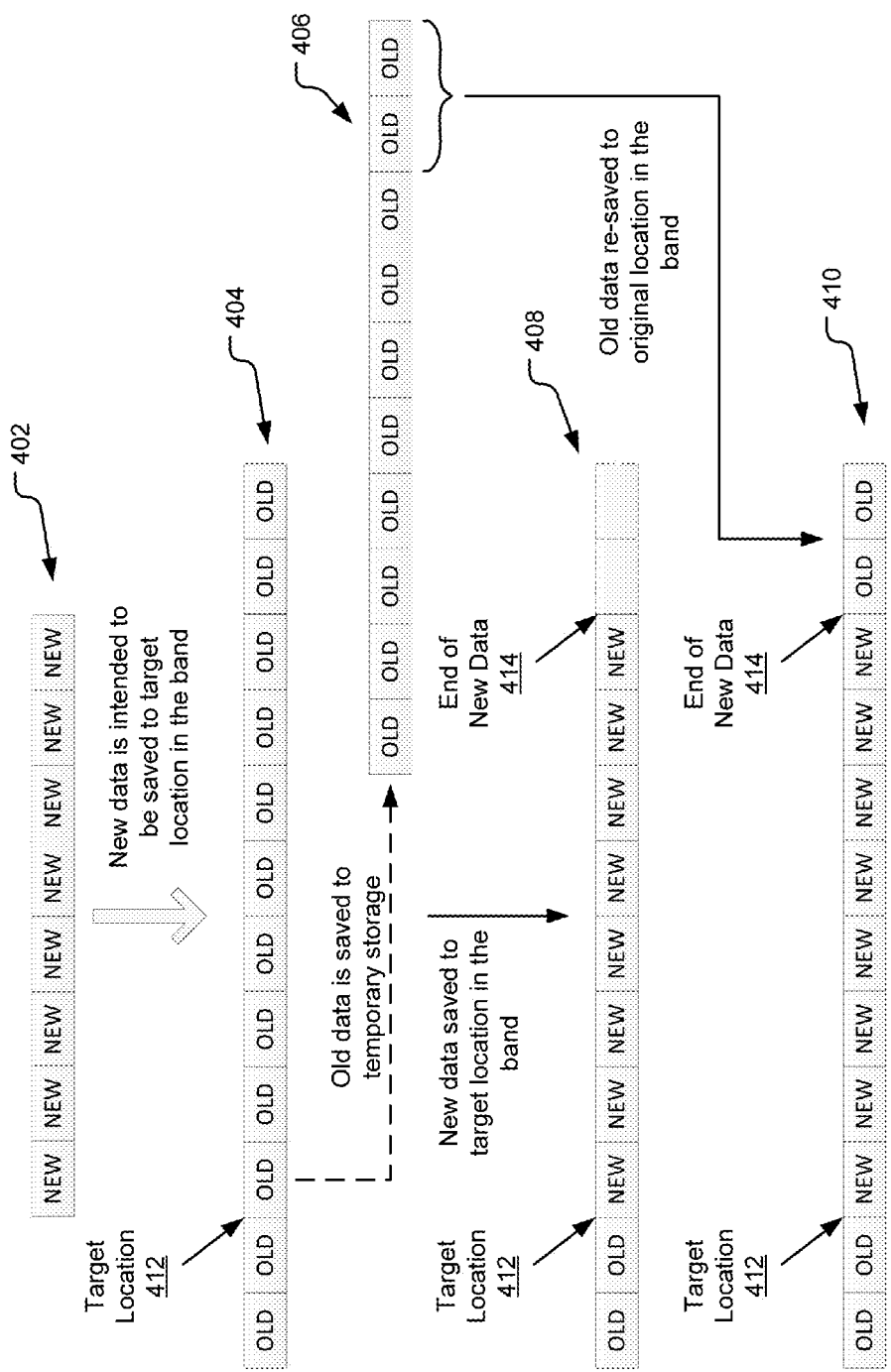
FIG. 4 illustrates updating of a grouping of data, in accordance with one embodiment.

FIG. 4 illustrates how new data can be inserted into an existing set of data. FIG. 4 shows a sequence of new data 402 that has been provided to update a portion of a band of data. As noted above, a "band" is a set of one or more data tracks for which the write process is permitted to overlap. The data sequence 404 represents such a band of data. The target address 412 is provided so that the data in data sequence 404 can be backed up beginning at that address. Data sequence 406 illustrates the data sequence that is read from the disc and backed up in temporary storage. Should a recovery operation be required, the data sequence can be retrieved from temporary storage. Once the old data from the disc is backed up in temporary storage, the new data may be written to the disc. Data sequence 408 shows the data on the disc after the new data has been written to the disc beginning at target address 412 and ending at address location 414. Once the new data has been written to the disc, the remaining old data on the band can be written to the disc. Thus, block 410 shows, for example, that the two last sequential data blocks can be retrieved from temporary storage and written to the disc as part of sequential data string 410.

Figure 5A:
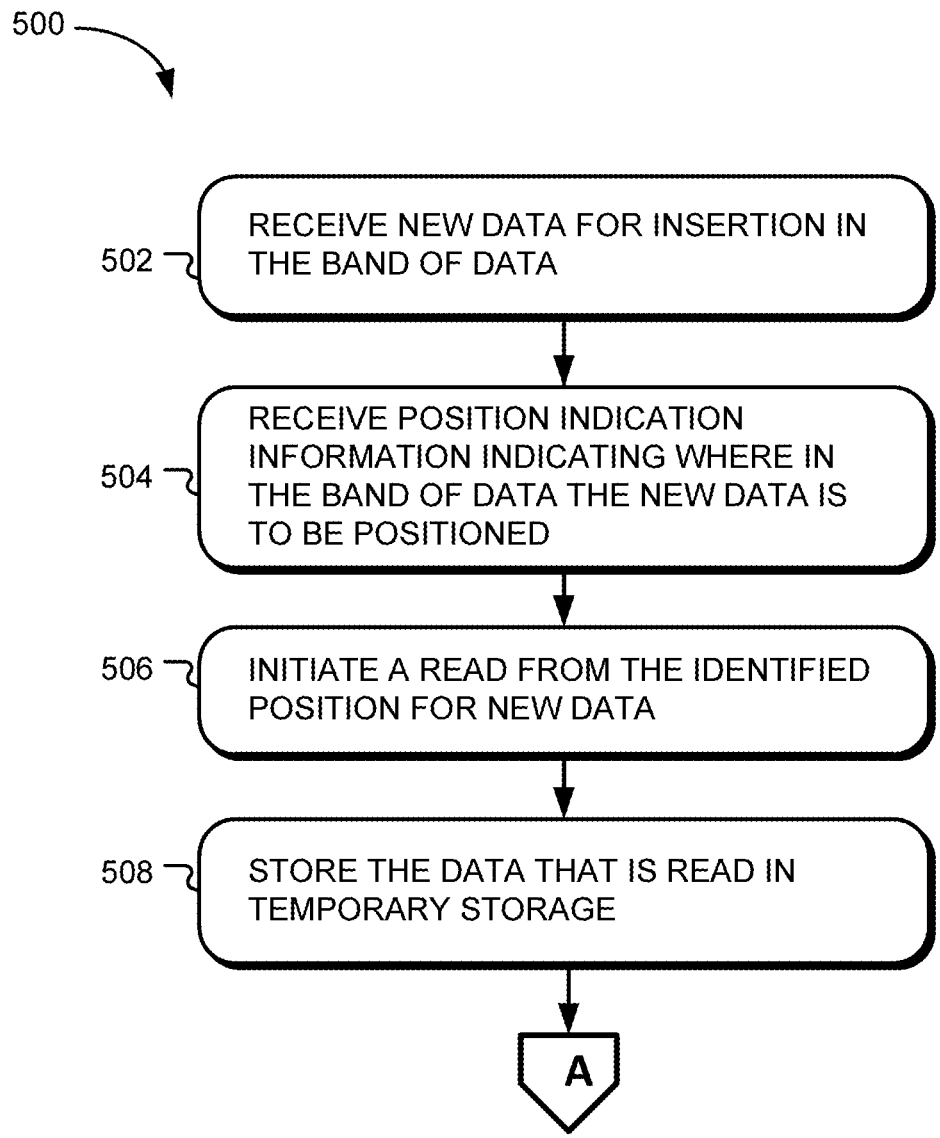
FIGS. 5A and 5B illustrate a flowchart showing a method of updating data in accordance with one embodiment.
Figure 5B:
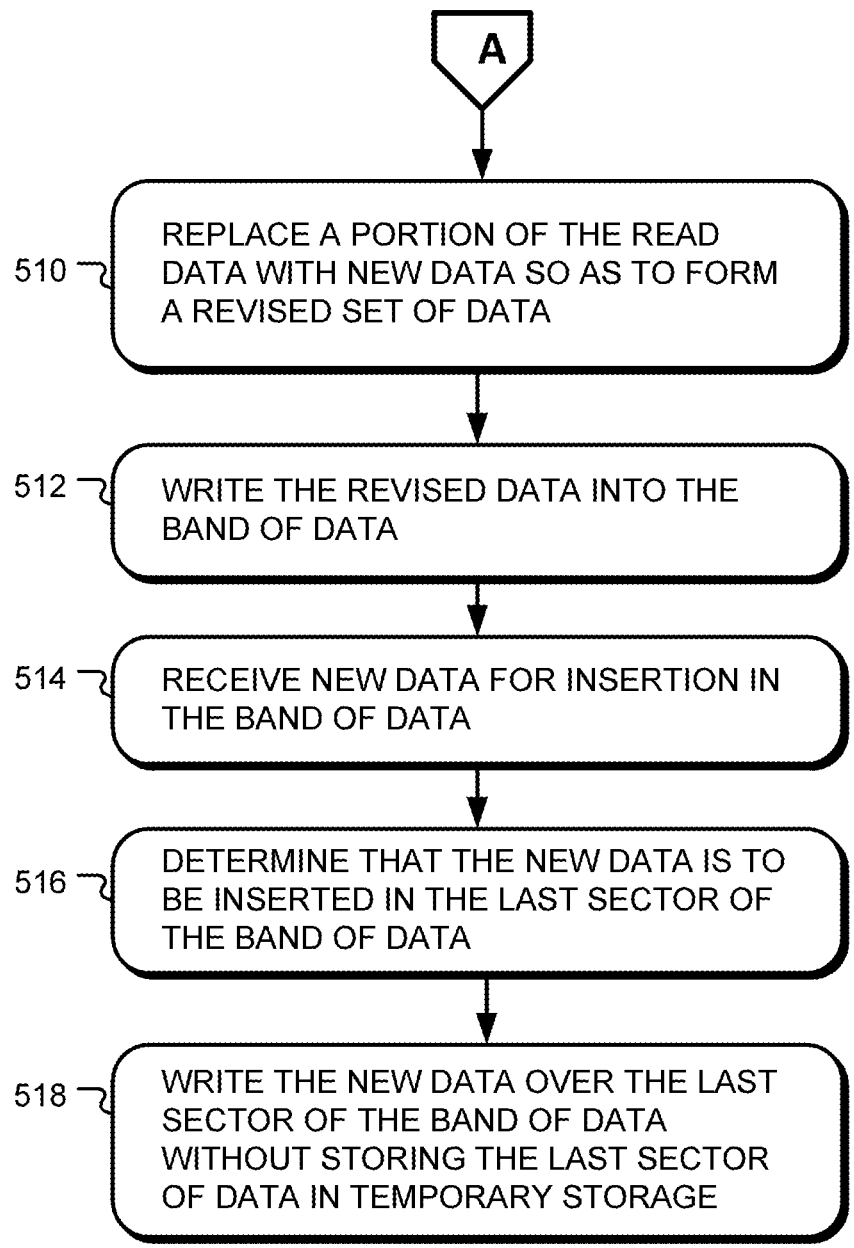

FIGS. 5A and 5B show a flowchart 500 that illustrates another example of a partial read-modify-write operation within a band. In operation 502, new data is received for insertion into a section of data on a magnetic storage medium, such as a band of data stored on a disc. Also, operation 504 shows that position indication information, such as an address for a sector of a track in the band of data, is received that indicates where in the section of data the new data should be positioned. Thus, operation 504 shows where in the band of data the new data should be stored.

Operation 506 shows that a read operation is initiated from the location that has been identified for a new data update. Less than the entire band of data is thus read from the recording medium. This data may then be stored in temporary storage as shown by block 508.

In operation 510, a portion of the old data that has been read from the disc may be modified with the new data. This effectively forms a revised set of data. The revised set of data can be formed at a variety of different locations. For example, a revised set of data could be configured by a controller that controls a disc. Similarly, a host computer could form the revised set of data. Alternatively, the revised set of data could be formed by a processor separate from the controller and host. Operation 512 shows the revised set of data may be written to the storage medium that is being updated. Thus, for example, the revised set of data may be written into the band of data on the disc.

In operation 514, new data can be received for insertion into the band of data. In operation 516, a determination can be made that the new data is to be stored in the last sector of the band of data. And, in operation 518 the new data can be written over the last sector of the band of data without first storing the last sector of data in temporary memory. In operation 518, the write operation can begin at the location where the new data has been designated to be added and can continue through to the end of the band on the disc.

The process shown in FIGS. 5A and 5B effectively results in the write operation writing over less than the entire band of data in order to perform a read-modify-write operation on the recording medium. The first portion of the band of data on the disc need not be written over since it has not been modified. Thus, time can be saved and an update operation can be performed efficiently.

Although the block diagrams and flowcharts disclosed herein describe various embodiments in the context of storage devices for purposes of illustration and explanation, it is to be understood that the technology disclosed herein can be more broadly used for storage media beyond simply disc drives.

In one implementation, the block diagrams and flowcharts disclosed above are implemented in hardware and/or in software (including firmware, resident software, micro-code, etc.). Furthermore, various implementations may take the form of a computer program product on a non-transitory computer-usable or computer-readable storage medium having computer-usable or computer-readable program code embodied in the medium for use by or in connection with an instruction execution system.

The embodiments described herein may be implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system. Accordingly, the logical operations making up the embodiments described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. A method comprising:
   in response to receiving a sequence of new data for insertion at an intermediate position in a band of data stored on a magnetic recording medium, reading a sequence of old data comprising less than the entire band of data beginning from the intermediate position to the end of the band;
   storing the sequence of the old read data into temporary storage;
   initiating a write operation on the band of data with the sequence of new data at the intermediate position within the band of data thereby replacing a portion of the old read data; and
   writing an unmodified remaining part of the sequence of the old read data that was not replaced by the sequence of new data from the temporary storage to an end of the band of data.

2. The method as claimed in claim 1 wherein the write operation comprises:
   utilizing shingled write operations.

3. The method as claimed in claim 1 and further comprising:
   reading less than the entire band of data from the magnetic recording medium; and then writing over less than the entire band of data on the recording medium.

4. The method as claimed in claim 1 and further comprising:
   determining that the new data is to be inserted in a last sector of the band of data;
   writing the new data over the last sector of the band of data without storing the last sector of data in temporary storage.

5. The method as claimed in claim 1 and further comprising:
   reading the less than the entire band of data from the magnetic recording medium as old read data; and
   revising the old read data with new data so as to form an updated version of the old read data;
   wherein the initiating the write operation on the band of data at the intermediate position within the band of data comprises:
   writing the updated version of the old read data to the magnetic recording medium.

6. The method as claimed in claim 1 and further comprising:
   receiving a position indication information indicating a sector of the band of data; and
   wherein the initiating the write operation on the band of data at the intermediate position within the band of data comprises initiating the write operation at the indicated sector of the band of data.

7. The method as claimed in claim 1 wherein the initiating the write operation on the band of data at the intermediate position within the band of data comprises:
   writing over a portion of the band of data while not writing over the beginning of the band of data.

8. The method as claimed in claim 1, further comprising not reading old data from a beginning position of the band to the intermediate position of the band.

9. The method as claimed in claim 1, further comprising reading old data only from the intermediate position of the band to the end of the band.

10. The method as claimed in claim 1, wherein writing an unmodified remaining part of read data further comprises writing an unmodified remaining part of old data back from the temporary storage to the band of data.

11. One or more non-transitory computer-readable storage media encoding computer-executable instructions for executing on a computer system a computer process, the computer process comprising:
    in response to receiving a sequence of new data for insertion at an intermediate position in a band of data stored on a magnetic recording medium, reading a sequence of old data comprising less than the entire band of data beginning from the intermediate position to the end of the band;
    storing the sequence of the old read data into temporary storage;
    initiating a write operation on the band of data with the sequence of new data at the intermediate position within the band of data thereby replacing a portion of the old read data; and
    writing an unmodified remaining part of the sequence of the old read data that was not replaced by the sequence of new data from the temporary storage to an end of the band of data.

12. The one or more non-transitory computer-readable storage media of claim 11 wherein the computer process further comprises:
    utilizing shingled write operations.

13. The one or more non-transitory computer-readable storage media of claim 11 wherein the computer process further comprises:
    writing over less than the entire band of data on the magnetic recording medium.

14. The one or more non-transitory computer-readable storage media of claim 11 wherein the computer process further comprises:
    determining that the new data is to be inserted in a last sector of the band of data;
    writing the new data over the last sector of the band of data without storing the last sector of data in the temporary storage.

15. The one or more non-transitory computer-readable storage media of claim 11 wherein the computer process further comprises:
    reading the less than the entire band of data from the magnetic recording medium as old read data;
    revising the old read data with the new data so as to form an updated version of the old read data;
    wherein the initiating the write operation on the band of data at the intermediate position within the band of data comprises:
    writing the updated version of the old read data to the magnetic recording medium.

16. The one or more non-transitory computer-readable storage media of claim 11 wherein the computer process further comprises:
    receiving a position indication information indicating a sector of the band of data; and wherein the initiating the write operation on the band of data at the intermediate position within the band of data comprises initiating the write operation at the indicated sector of the band of data.

17. The one or more non-transitory computer-readable storage media of claim 11 wherein the initiating the write operation on the band of data at the intermediate position within the band of data of the computer process further comprises:
   writing over a portion of the band of data while not writing over the beginning of the band of data.

18. An apparatus for storing data, the apparatus comprising:
   a recording device configured to initiate a write operation with a sequence of new data on a band of data stored on a magnetic recording medium at an intermediate position within the band of data by reading a sequence of old data comprising less than the entire band of data beginning from the intermediate position to the end of the band, storing the sequence of the old read data into temporary storage, writing the sequence of new data at the intermediate position within the band of data thereby replacing a portion of the old read data, and writing an unmodified remaining part of the sequence of the old read data that was not replaced by the sequence of new data from the temporary storage to an end of the band of data.

19. The apparatus as claimed in claim 18 wherein the recording device comprises:
   a recording head; and
   a processor to control the recording head to perform shingled write operations.

\* \* \* \* \*